United States Patent
Nishihama et al.

(10) Patent No.: US 8,841,812 B2
(45) Date of Patent: Sep. 23, 2014

(54) SQUIRREL-CAGE INDUCTION MOTOR

(75) Inventors: Kazuo Nishihama, Hitachinaka (JP);
Hiroyuki Mikami, Hitachinaka (JP);
Tadahiro Shimozono, Bankok (TH);
Keiichiro Kaihatsu, Kamagaya (JP);
Atsushi Abe, Matsudo (JP)

(73) Assignee: Hitachi Ltd, Tokyo (JP)

( * ) Notice: Subject to any disclaimer, the term of this patent is extended or adjusted under 35 U.S.C. 154(b) by 626 days.

(21) Appl. No.: 13/034,659

(22) Filed: Feb. 24, 2011

(65) Prior Publication Data

US 2011/0234039 A1    Sep. 29, 2011

(30) Foreign Application Priority Data

Mar. 29, 2010 (JP) ................................ 2010-075270

(51) Int. Cl.
*H02K 1/06*    (2006.01)
*H02K 17/16*    (2006.01)

(52) U.S. Cl.
CPC .......... *H02K 17/165* (2013.01); *H02K 2213/03* (2013.01)
USPC .............. 310/211; 310/216.111; 310/216.004

(58) Field of Classification Search
USPC ............. 310/156.78, 156.79, 156.81–156.84, 310/125, 211, 212, 216.016, 216.018, 310/216.025, 216.029, 216.109, 216.111, 310/216.113, 216.114, 51, 166
See application file for complete search history.

(56) References Cited

U.S. PATENT DOCUMENTS

| | | | | |
|---|---|---|---|---|
| 3,017,553 | A | * | 1/1962 | Homan ......................... 318/737 |
| 3,774,062 | A | * | 11/1973 | Johnson ....................... 310/184 |
| 4,115,915 | A | * | 9/1978 | Godfrey ......................... 29/596 |
| 5,172,020 | A | * | 12/1992 | Hibino et al. ................... 310/26 |
| 5,182,483 | A | * | 1/1993 | Hibino et al. .................. 310/211 |

(Continued)

FOREIGN PATENT DOCUMENTS

| | | | | |
|---|---|---|---|---|
| CN | 85205739 | | 10/1986 | |
| CN | 1808861 | | 7/2006 | |
| EP | 435313 A1 | * | 7/1991 | ............. H02K 17/16 |
| JP | 49-15133 | | 4/1974 | |
| JP | 57-049357 | | 3/1982 | |
| JP | 61-180554 | | 8/1986 | |

(Continued)

OTHER PUBLICATIONS

Office Action in corresponding Application No. 201110048736.2 dated Feb. 22, 2013, with English translation thereof.

*Primary Examiner* — Quyen Leung
*Assistant Examiner* — Naishadh Desai
(74) *Attorney, Agent, or Firm* — Antonelli, Terry, Stout & Kraus, LLP.

(57) ABSTRACT

An object of the present invention is to provide a squirrel-cage induction motor with high efficiency. In a squirrel-cage induction motor including a stator in which stator windings are wound in a number of stator slots arranged at intervals in the vicinity of the inner periphery of a stator core and a rotor in which rotor conductors are embedded in a number of rotor slots arranged at intervals in the vicinity of the outer periphery of a rotor core and end rings are provided at both ends of the rotor core, the rotor core is formed of a plurality of blocks, an annular short-circuit ring is provided between respective blocks of the rotor core to short-circuit the rotor conductors, and laminated thickness of the rotor core is made larger than laminated thickness of the stator core.

3 Claims, 11 Drawing Sheets

(56) References Cited

U.S. PATENT DOCUMENTS

| | | | |
|---|---|---|---|
| 5,668,429 A * | 9/1997 | Boyd et al. | 310/216.071 |
| 6,777,847 B1 * | 8/2004 | Saban et al. | 310/211 |
| 7,642,685 B2 * | 1/2010 | Nakayama et al. | 310/211 |
| 2006/0163969 A1 | 7/2006 | Nemoto et al. | |
| 2006/0192457 A1 * | 8/2006 | Nakayama et al. | 310/211 |
| 2008/0238235 A1 * | 10/2008 | Takahashi et al. | 310/156.78 |
| 2009/0200888 A1 * | 8/2009 | Tanaka et al. | 310/195 |
| 2009/0224627 A1 * | 9/2009 | Hino et al. | 310/216.077 |
| 2011/0074240 A1 * | 3/2011 | Hiramatsu et al. | 310/211 |

FOREIGN PATENT DOCUMENTS

| | | |
|---|---|---|
| JP | 4-165945 | 6/1992 |
| JP | 07-163108 | 6/1995 |
| JP | 9-215286 | 8/1997 |
| JP | 10-174387 | 6/1998 |
| JP | 2001-45725 | 2/2001 |

* cited by examiner

FIG. 1

LAMINATED THICKNESS DIRECTION

SQUIRREL-CAGE INDUCTION MOTOR

CLAIM OF PRIORITY

The present application claims priority from Japanese Patent application serial no. 2010-075270,filed on Mar. 29, 2010, the content of which is hereby incorporated by reference into this application.

FIELD OF THE INVENTION

The present invention relates to a squirrel-cage induction motor, and relates more specifically to a squirrel-cage induction motor with improved efficiency.

BACKGROUND OF THE INVENTION

As publicly known examples in relation with a skew structure of a rotor in conventional squirrel-cage induction motors, Japanese Unexamined Patent Application Publication No. H7-163108 and Japanese Unexamined Patent Application Publication No. S57-49357 disclose prior arts in which an annular short-circuit ring is provided between respective blocks and rotor conductors are short-circuited.

Although the prior arts disclosed in the Japanese Unexamined Patent Application Publication No. H7-163108 and the Japanese Unexamined Patent Application Publication No. S57-49357 are the arts in relation with a skew structure of a rotor, magnetic resistance increases at the position provided with the short-circuit ring, no-load current increases, and efficiency lowers.

An object of the present invention is to provide a squirrel-cage induction motor with high efficiency.

SUMMARY OF THE INVENTION

According to the present invention, in a squirrel-cage induction motor including a stator in which stator windings are wound in a number of stator slots arranged at intervals in the vicinity of the inner periphery of a stator core and a rotor in which rotor conductors are embedded in a number of rotor slots arranged at intervals in the vicinity of the outer periphery of a rotor core and end rings are provided at both ends of the rotor core, the laminated thickness of the rotor core is made larger than the laminated thickness of the stator core.

According to the present invention, in a squirrel-cage induction motor including a stator in which stator windings are wound in a number of stator slots arranged at intervals in the vicinity of the inner periphery of a stator core and a rotor in which rotor conductors are embedded in a number of rotor slots arranged at intervals in the vicinity of the outer periphery of a rotor core and end rings are provided at both ends of the rotor core, the rotor core is formed of a plurality of blocks, an annular short-circuit ring is provided between respective blocks of the rotor core to short-circuit the rotor conductors, and laminated thickness of the rotor core is made larger than laminated thickness of the stator core.

Also, the width of the short-circuit ring may be within a range larger than the rotor slot width and smaller than the rotor slot interval.

Also, the rotor slots provided in respective blocks of the rotor core may be arranged in the shaft direction and in positions alternate with respective blocks.

Also, the annular short-circuit ring provided between respective blocks of the rotor core may be formed of die-cast parts and non die-cast parts.

Also, the stator core may be formed of a plurality of blocks, and insulation parts may be provided between the blocks.

Also, the rotor core formed of a plurality of blocks may be configured that the width of the blocks differs from each other.

Also, laminated thickness of the stator core may be within the width of laminated thickness of the rotor core, and the distance in the shaft direction between the end of the laminated thickness of the stator core and the end of the laminated thickness of the rotor core may differ between the right and left sides of the shaft.

According to the present invention, in a squirrel-cage induction motor including a stator in which stator windings are wound in a number of stator slots arranged at intervals in the vicinity of the inner periphery of a stator core and a rotor in which rotor conductors are embedded in a number of rotor slots arranged at intervals in the vicinity of the outer periphery of a rotor core and end rings are provided at both ends of the rotor core, the stator core and the rotor core are formed of laminated cores, number of thin sheets of the laminated cores is equal to each other, the space factor of the rotor core is made smaller than that of the stator core, and laminated thickness of the rotor core is made larger than laminated thickness of the stator core.

Also, laminated thickness of the stator core may be within the width of laminated thickness of the rotor core, and the distance in the shaft direction between the end of the laminated thickness of the stator core and the end of the laminated thickness of the rotor core may differ between the right and left sides of the shaft.

Also, the rotor slots may be formed diagonal to the shaft with rotor conductors being embedded therein.

Also, laminated thickness of the stator core may be within the width of laminated thickness of the rotor core, and the rotor slots that are present inside the width of the laminated thickness of the rotor core and are positioned outside the laminated thickness of the stator core may be formed in the shaft direction with rotor conductors being embedded therein.

According to the present invention, a squirrel-cage induction motor with high efficiency can be provided.

DETAILED DESCRIPTION OF THE PREFERRED EMBODIMENTS

The present invention will be described in detail below based on the examples shown in the drawings. First, the basic constitution which is included in standard in respective examples of the squirrel-cage induction motor according to the present invention will be described.

Figure 1:
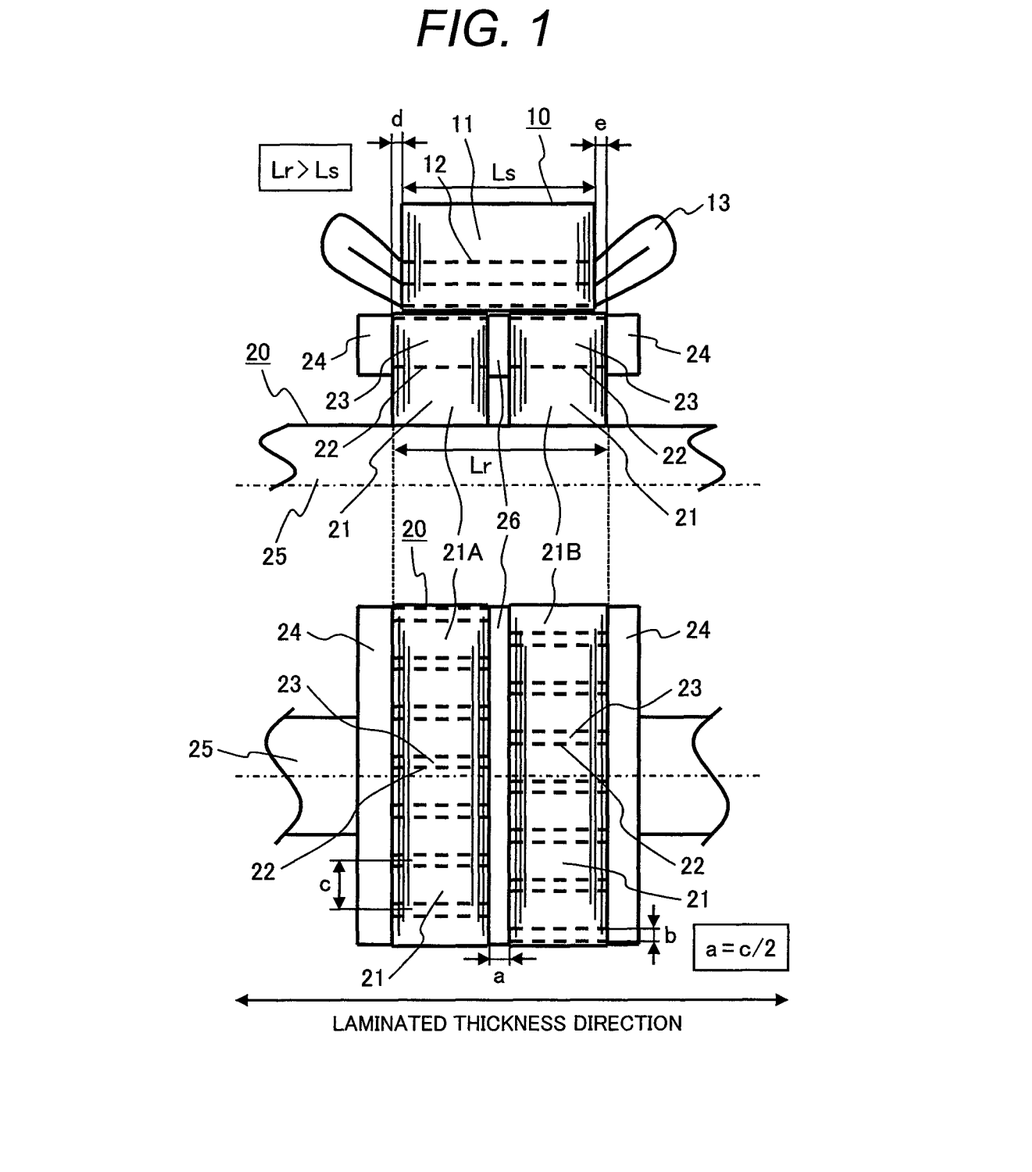
FIG. 1 is a drawing showing an example in which the rotor is divided and the laminated thickness of the rotor core is increased.

FIG. 1 shows a partial cross-sectional view (upper part of the drawing) of the squirrel-cage induction motor according to an example of the present invention and a front view (lower part of the drawing) of the rotor. The main part of the squirrel-cage induction motor shown in FIG. 1 includes a stator 10, a rotor 20, and a shaft 25.

Out of them, as shown in the partial cross-sectional view in the upper part of FIG. 1, the stator 10 includes a stator core 11, a number of stator slots 12 arranged at intervals in the vicinity of the inner periphery of the stator core 11, and stator windings 13 wound in the stator slots.

The rotor 20 includes a rotor core 21, a number of rotor slots 22 arranged at intervals in the vicinity of the outer periphery of the rotor core 21, rotor conductors 23 embedded in the rotor slots 22, and end rings 24 arranged at both ends of the rotor core 21.

Although the basic constitution which is included in standard in respective examples of the squirrel-cage induction motor according to the present invention is as described above, different portions or additional constitutions in each example, if any, will be described separately in each example.

Figure 2:
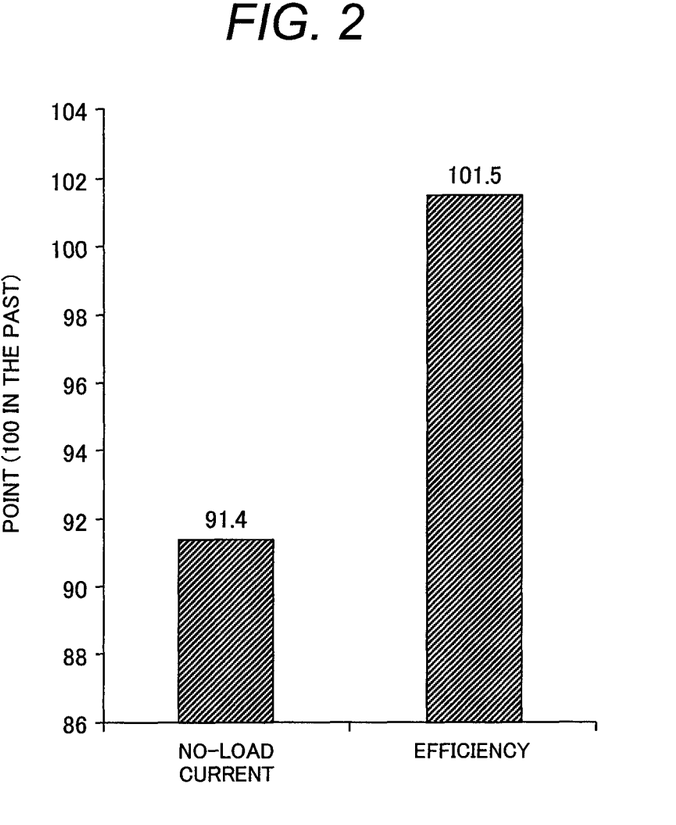
FIG. 2 is a drawing showing the effect of the present invention.

According to the present invention, in the basic constitution described above, the laminated thickness of the rotor core is made larger than the laminated thickness of the stator core. As a result of it, as shown in FIG. 2, no-load current can be reduced and efficiency is thereby improved.

Below, the first specific measure of "making the laminated thickness of the rotor core larger than the laminated thickness of the stator core" and its applications will be described using FIG. 1 and FIG. 4 to FIG. 10, and the second specific measure and its applications will be described using FIG. 3 and FIG. 11.

EXAMPLE

The first specific measure will be described referring to FIG. 1.

In the first specific measure, in order to "make the laminated thickness Lr of the rotor core larger than the laminated thickness Ls of the stator core", the rotor core 21 is formed of a plurality of blocks (21A and 21B), an annular short-circuit ring 26 is provided between respective blocks, and the rotor conductors 23 are short-circuited. That is, the laminated thickness of the rotor core is made larger utilizing the width of the short-circuit ring 26.

Next, the laminated thickness of the stator core 11 and the rotor core 21 will be studied. First, although the width a of the short-circuit ring 26 is made one half of the interval c of the rotor slots 22 in FIG. 1, it can be the width b of the rotor slots 22 or above and the interval c of the rotor slots 22 or below. This point will be more specifically described in the examples below.

The laminated thickness of the rotor core 21 is made larger than the stator core 11 by d plus e. That is, in the example shown in FIG. 1, marginal widths of e on the right side of the stator and d on the left side are provided. In the example, the width a of the short-circuit ring 26 is equal with the sum of d and e, and the dimension of d and e is made equal with each other. However, a does not need to be equal with the sum of d and e, and d and e do not need to be equal with each other. In any case, since the laminated thickness of the rotor core 21 is made larger than that of the stator core 11, increase of magnetic resistance can be relaxed, no-load current can be reduced, and efficiency can be improved.

According to the first specific measure, although magnetic resistance increases at the position provided with the short-circuit ring 26, because the laminated thickness of the rotor core 21 is made larger than that of the stator core 11, increase of magnetic resistance can be relaxed, no-load current can be reduced and efficiency can be improved as shown in FIG. 2.

FIG. 2 shows the characteristics of the squirrel-cage induction motor according to the present example when the characteristics of the squirrel-cage induction motor according to prior arts are made 100. No-load current can be reduced to 91.4 points from 100 points in the past, and efficiency can be thereby improved to 101.5 points from 100 points in the past.

According to the first specific measure, increase of magnetic resistance is relaxed, no-load current is reduced and efficiency is improved in the way as described above, however the configuration shown in FIG. 1 is devised in several points other than those. More specifically, in FIG. 1, the stator core 11 and the rotor core 21 are the laminated cores formed of thin sheets with the number equal with each other, and the slot position is differentiated by 0.5 slot pitch between respective blocks (21A and 21B).

As a result of it, the laminated thickness of the rotor core 21 can be made larger than that of the stator core 11 while the number of the thin sheets of the stator core 11 and the rotor core 21 remains equal with each other, and therefore the yield can be improved and the cost can be reduced.

Also, the slot position is differentiated by 0.5 slot pitch between respective blocks and the rotor 20 is made equivalent to have apparent skew, therefore abnormal torque, vibration and noise can be suppressed, generation of cross current loss by the skew can be prevented, and efficiency can be improved.

Furthermore, according to the present example, the rotor conductors 23, the end rings 24 and the short-circuit ring 26 are of aluminum die-cast construction, however they may be of copper die-cast construction.

Also, according to the present example, the short-circuit ring 26 is provided by one number, however it may be in plural numbers, the slot positions can be differentiated between respective blocks and the rotor 20 can be made equivalent to have apparent skew, therefore abnormal torque, vibration and noise can be suppressed, generation of cross current loss by the skew can be prevented, and efficiency can be improved.

In addition, according to the present example, the number of the thin sheets of the rotor core 21 is made equal for respective blocks, however it may not be equal with each other, the laminated thickness of the rotor core 21 is made larger than that of the stator core 11, therefore increase of magnetic resistance can be relaxed, no-load current can be reduced and efficiency can be improved.

Next, the second specific measure will be described referring to FIG. 3.

According to the second specific measure, in order to "make the laminated thickness Lr of the rotor core larger than the laminated thickness Ls of the stator core", the space factor of the rotor core 21 is made smaller than that of the stator core 11. In other words, the interval between the thin sheets on the rotor core 21 side was increased while the number of the thin sheets of the stator core 11 and the rotor core 21 remains equal with each other, and the relation described above is achieved. In this regard, when the space factor of the stator core 11 is ks and the space factor of the rotor core 21 is kr, ks>kr is satisfied.

As a result of it, the laminated thickness of the rotor core 21 is made larger than that of the stator core 11 without providing the short-circuit ring 26, therefore magnetic resistance is reduced, no-load current is reduced, and efficiency is improved.

Also, the laminated thickness of the rotor core 21 can be made larger than that of the stator core 11 while the number of the thin sheets of the stator core 11 and the rotor core 21 remains equal with each other, therefore the yield can be improved and the cost can be reduced.

According to the second specific measure, increase of magnetic resistance is relaxed, no-load current is reduced and efficiency is improved in the way as described above, however the configuration shown in FIG. 3 is devised in several points other than those. More specifically, in FIG. 3, the rotor 20 is performed with skewing (the construction in which the slots 22 and the conductors 23 are arranged diagonal).

In this case, because the space factor of the rotor core 21 is small, the magnetic resistance in the laminated thickness direction can be increased and leakage magnetic flux in the laminated thickness direction caused by skewing can be reduced, and therefore efficiency can be improved. Also, because skewing is performed, abnormal torque, vibration and noise can be suppressed.

Figure 3:
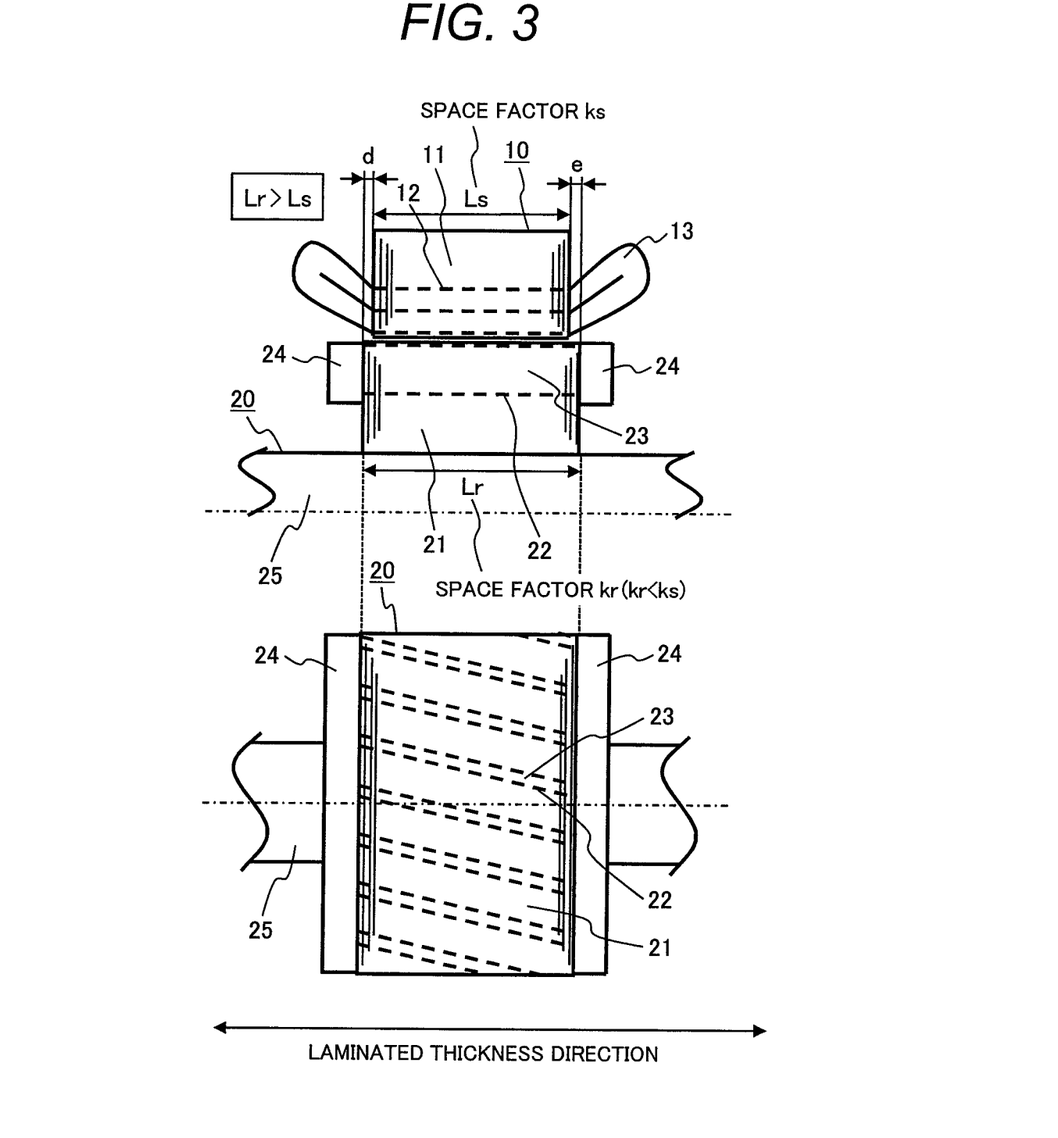
FIG. 3 is a drawing showing an example in which the laminated thickness of the rotor core is increased by the influence of the space factor.

Also, in FIG. 3, although skewing is performed uniformly, skewing is not required in the positions where the stator core 11 and the rotor core 21 do not face with each other (the positions of d and e in FIG. 3), and abnormal torque, vibration and noise can be suppressed even in that case.

Figure 4:
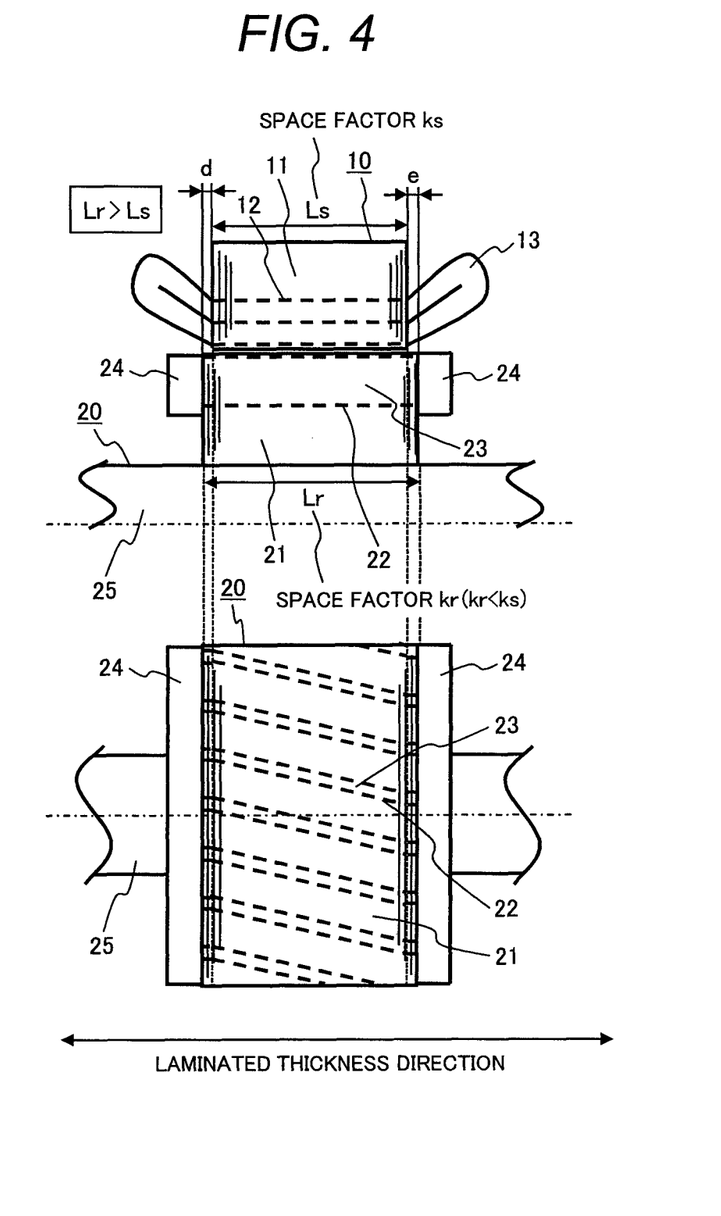
FIG. 4 is a drawing showing a modified example of the constitution shown in FIG. 3.

FIG. 4 shows the construction in which skewing is not performed (the slots 22 and the conductors 23 are not arranged diagonal) in the positions where the stator core 11 and the rotor core 21 do not face with each other (the positions of d and e in FIG. 4). According to the present example, skewing is not performed in the positions where the stator core 11 and the rotor core 21 do not face with each other (the positions of d and e in FIG. 4), leakage magnetic flux in the laminated thickness direction caused by skewing in the positions can be reduced, and efficiency can be improved.

Also, even when the stator core 10 is performed with skewing, by making the space factor of the rotor core 21 smaller than that of the stator core 11 and making the laminated thickness of the rotor core 21 larger than that of the stator core 11 while the number of the thin sheets of the stator core 11 and the rotor core 21 remains equal with each other, leakage magnetic flux in the laminated thickness direction caused by skewing can be reduced, and efficiency can be improved.

Next, since regarding the first specific measure in FIG. 1, it is described that "although the width a of the short-circuit ring 26 is made one half of the interval c of the rotor slots 22 in FIG. 1, it can be the width b of the rotor slots 22 or above and the interval c of the rotor slots 22 or below", this point will be described.

Figure 5:
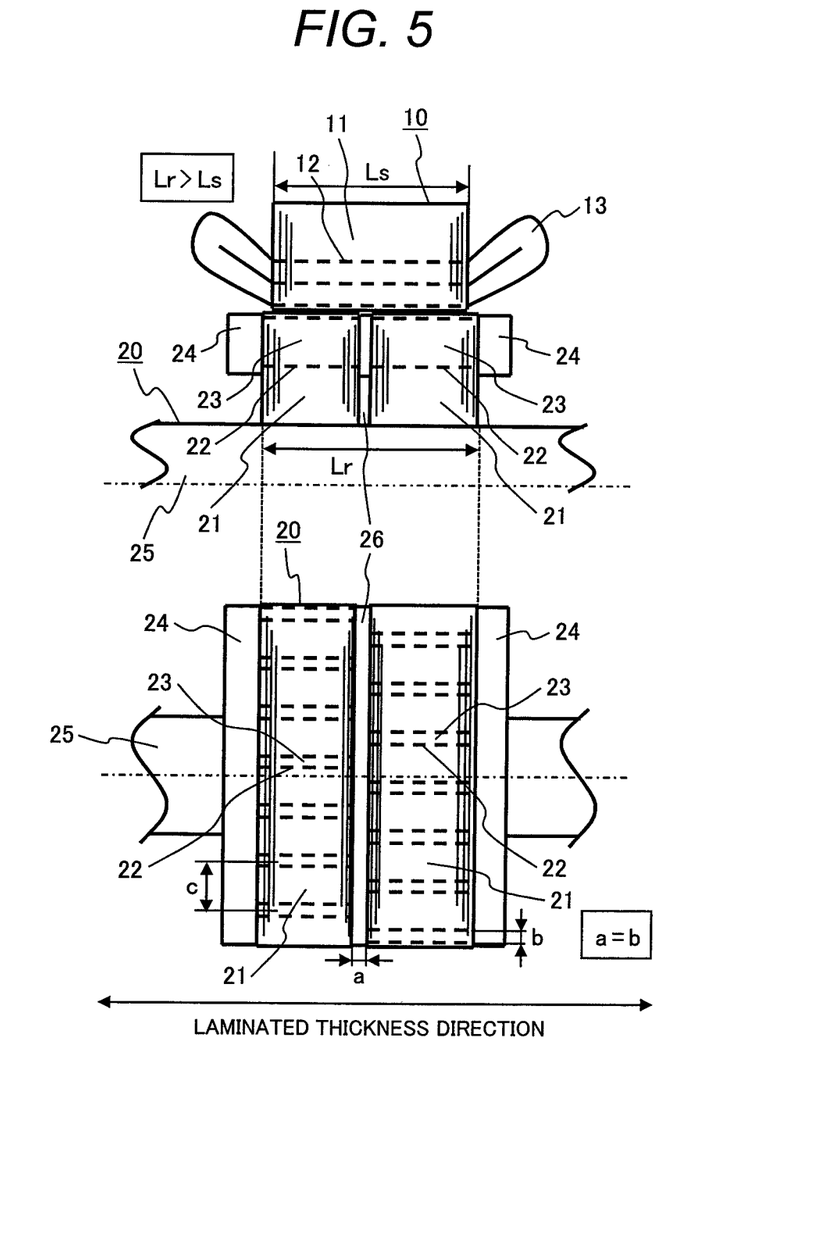
FIG. 5 is a drawing showing an example in which the width of the short-circuit ring is made equal to the width of the slots in the constitution shown in FIG. 1.

FIG. 5 shows an example in which the width a of the short-circuit ring 26 is made equal with the width b of the rotor slots 22. When compared with the case of FIG. 1, the width a of the short-circuit ring 26 in the case of FIG. 5 is narrower, therefore magnetic resistance of the short-circuit ring 26 portion can be lowered than that in the case of FIG. 1, and efficiency is improved.

Figure 6:
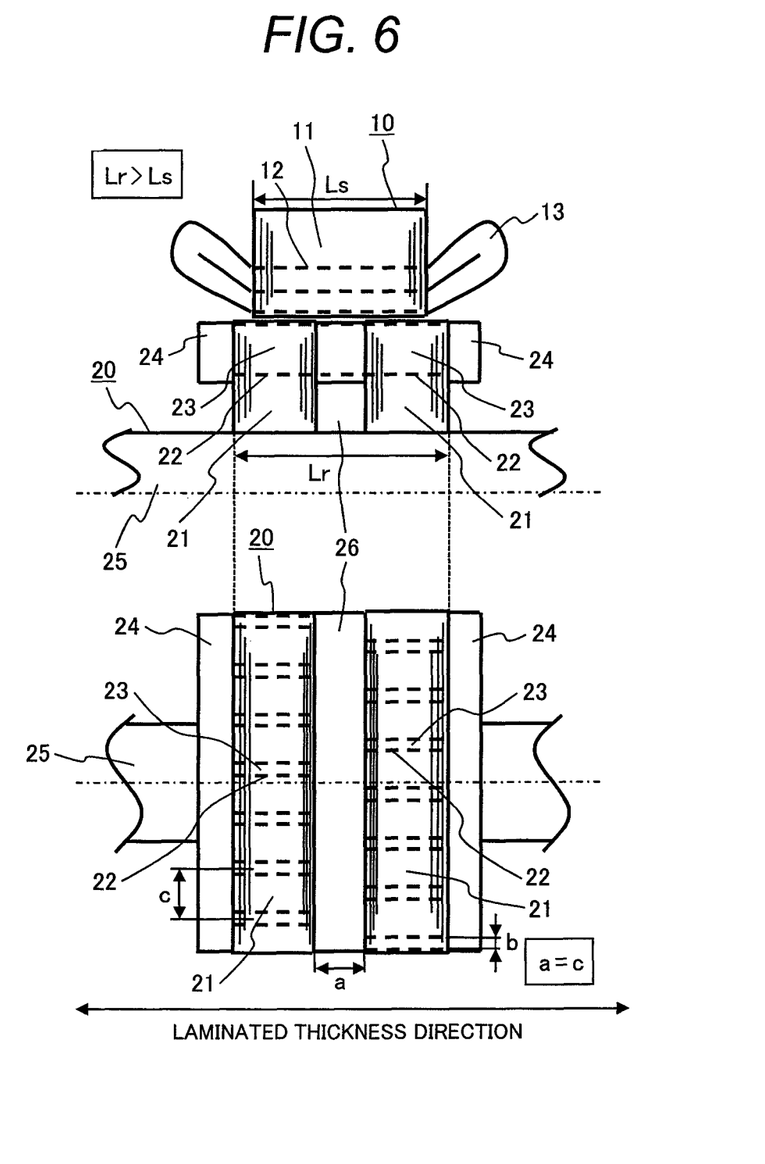
FIG. 6 is a drawing showing an example in which the width of the short-circuit ring is made equal to the interval of the slots in the constitution shown in FIG. 1.

FIG. 6 shows an example in which the width a of the short-circuit ring 26 is made equal with the interval c of the rotor slots 22. When compared with the case of FIG. 1, the width a of the short-circuit ring 26 in the case of FIG. 6 is wider, therefore magnetic resistance of the short-circuit ring 26 portion is larger than that in the case of FIG. 1, however the difference between the laminated thickness of the stator core Ls and the laminated thickness of the rotor core Lr increases. In this case, advantage of the latter surpasses disadvantage of the former, and overall efficiency improves.

From the descriptions on FIG. 5 and FIG., followings can be said.

First, when the width a of the short-circuit ring is made narrower, magnetic resistance of the short-circuit ring lowers which acts to improve the efficiency. However, on the other hand, the increment of Lr is reduced, and the effect of efficiency improvement by lowering of magnetic resistance due to Ls<Lr is reduced. Also, the adverse effects of the rise of the current density of the short-circuit ring, increase of the copper loss of the short-circuit ring, and lowering of efficiency are caused. In general, when the width a of the short-circuit ring is narrowed excessively, adverse effects surpass.

On the contrary, when the width a of the short-circuit ring is increased, although magnetic resistance of the short-circuit ring rises which adversely acts to lower efficiency, the increment of Lr increases, and the effect of efficiency improvement by lowering of magnetic resistance due to Ls<Lr is large. However, when the width a of the short-circuit ring is increased excessively, adverse effects surpass.

Thus, according to the present invention, it does not work when the width a of the short-circuit ring is too small and too large. There is an appropriate range for it which is b<a<c.

Below, several modification examples that can be adopted while maintaining the features of the first specific measure shown in FIG. 1 will be described. To begin with, the first modification example of the first specific measure is shown in FIG. 7.

Figure 7:
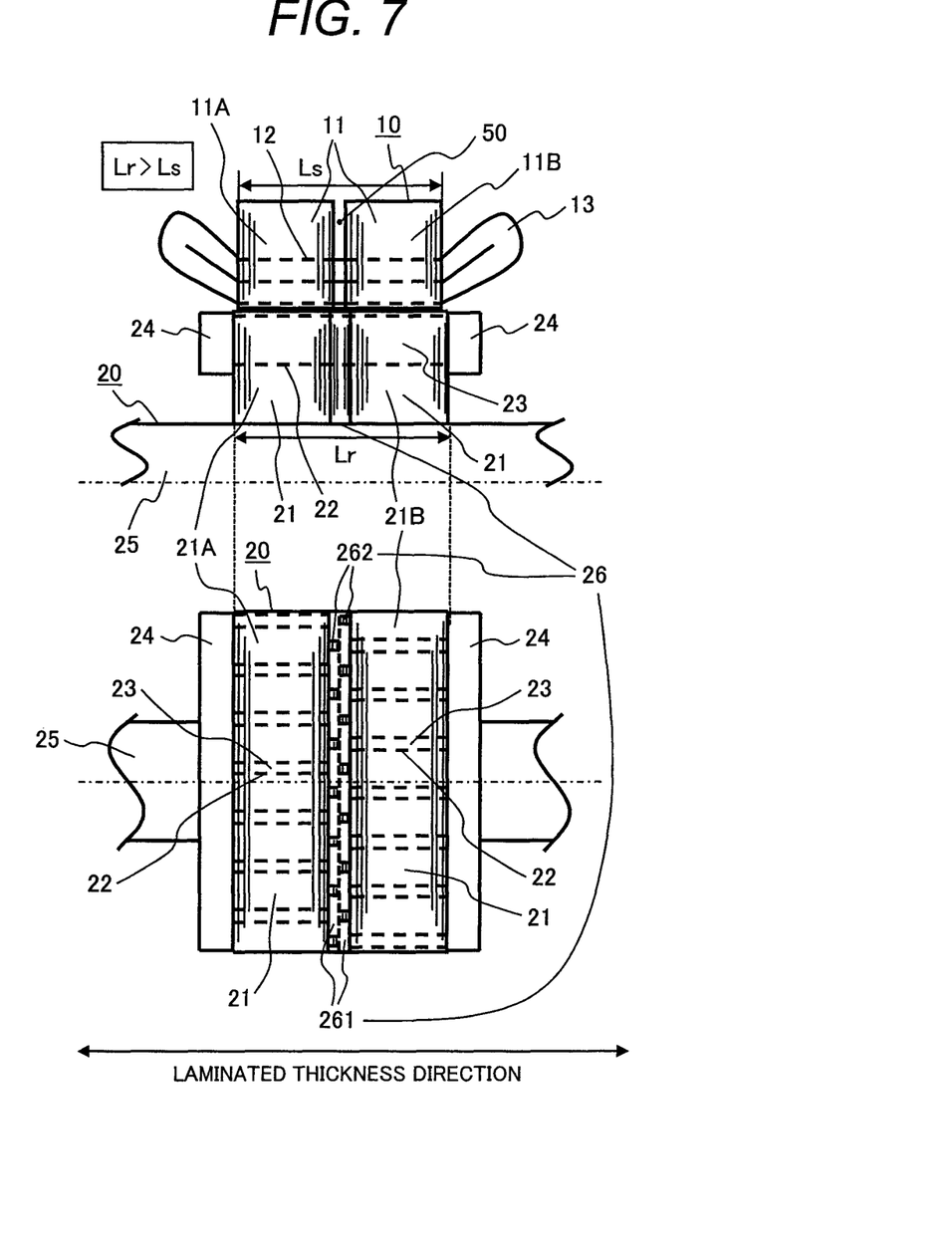
FIG. 7 is a drawing showing an example in which the short-circuit ring is formed of die-cast parts and non die-cast parts in the constitution shown in FIG. 1.

The configuration shown in FIG. 7 is modified from that shown in FIG. 1 in that the short-circuit ring 26 is constructed to be divided into die-cast parts 261 and non die-cast parts 262, the stator core 11 is formed of a plurality of blocks (11A and 11B), and an air layer is provided between respective blocks. Out of them, the features of the short-circuit ring 26 will be described. The short-circuit ring 26 is divided into the die-cast parts 261 and the non die-cast parts 262, and short-circuits the rotor inductors 23 by using a conductive material for the die-cast parts 261.

Thus, by making a part of the short-circuit ring 26 of non-diecasting, a jig usually required for die-casting (casting) is not required. That is, when there is no non die-cast portions in the short-circuit ring 26, a jig (mold) exclusively used for shaping the short-circuit ring 26 becomes necessary in die-casting (casting), however, when the non die-cast parts are used as the mold, exclusive mold is not required.

Also, according to the present example, the rotor conductors 23, the end rings 24 and the die-cast parts 261 of the short-circuit ring 26 are of aluminum die-cast construction, however they may be of copper die-cast construction.

Figure 8:
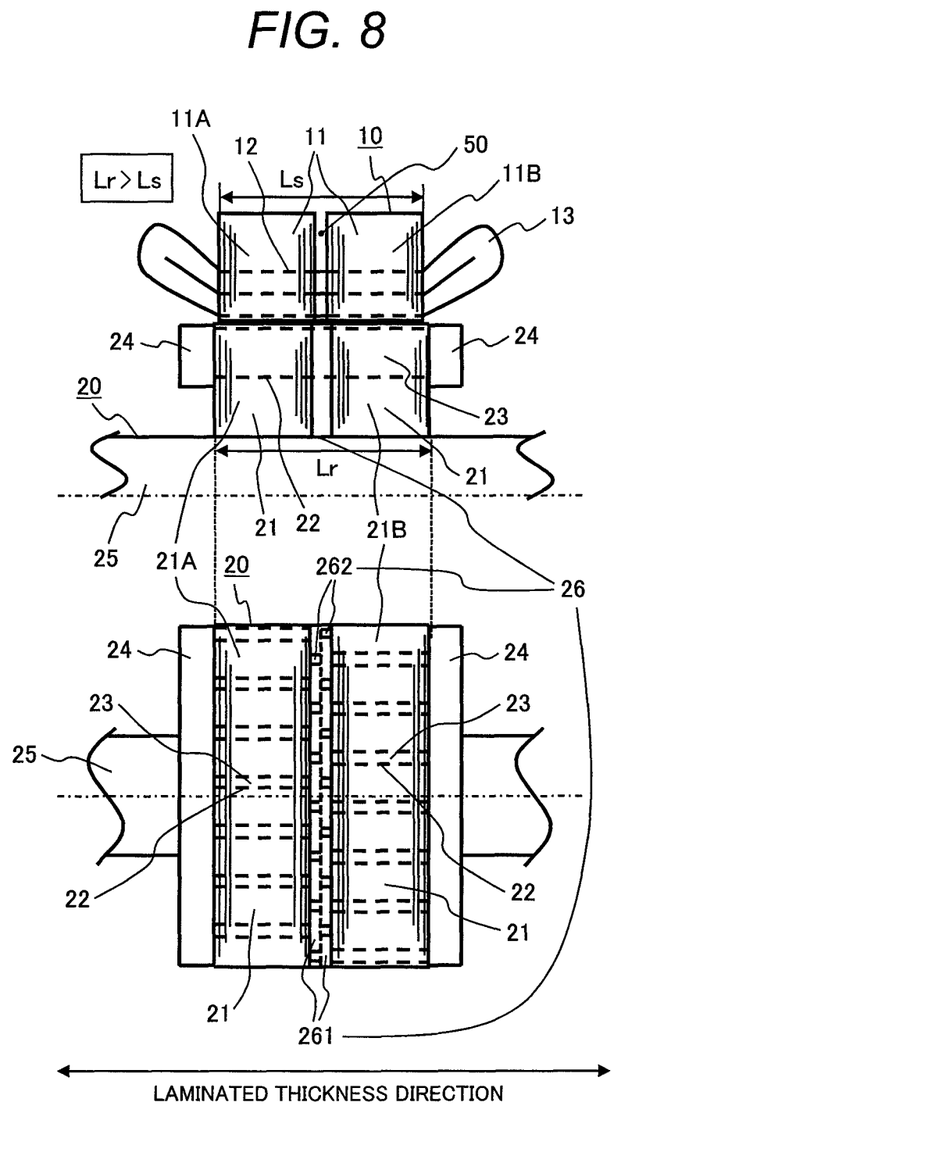
FIG. 8 is a drawing showing an example in which the non die-cast parts are made lumpy in the constitution shown in FIG. 7.

Furthermore, according to the present example, the non die-cast parts 262 are of laminated cores of thin sheets, however they may be of lumpy aluminum lumps or copper lumps. FIG. 8 shows an example in which the non die-cast parts 262 are of lumpy aluminum lumps or copper lumps while basically adopting the construction shown in FIG. 7.

Also, the slot position is differentiated by 0.5 slot pitch between respective blocks and the rotor 20 is made equivalent to have apparent skew, therefore abnormal torque, vibration and noise can be suppressed, generation of cross current loss by the skew can be prevented, and efficiency can be improved.

In addition, because the stator core 11 is formed of a plurality of blocks (11A and 11B), an air layer 50 is provided between respective blocks of the stator core 11. Accordingly, leakage magnetic flux in the laminated thickness direction caused by skewing of the rotor can be reduced, and efficiency can be improved. Furthermore, according to the present example, although the gaps between respective blocks of the stator core 11 are the air layer, they need only be of nonmagnetic material, and even if the gaps between respective blocks, as far as they are a part thereof, are of magnetic material, the effect of efficiency improvement by reduction of leakage magnetic flux in the laminated thickness direction caused by skewing can be expected.

Figure 9:
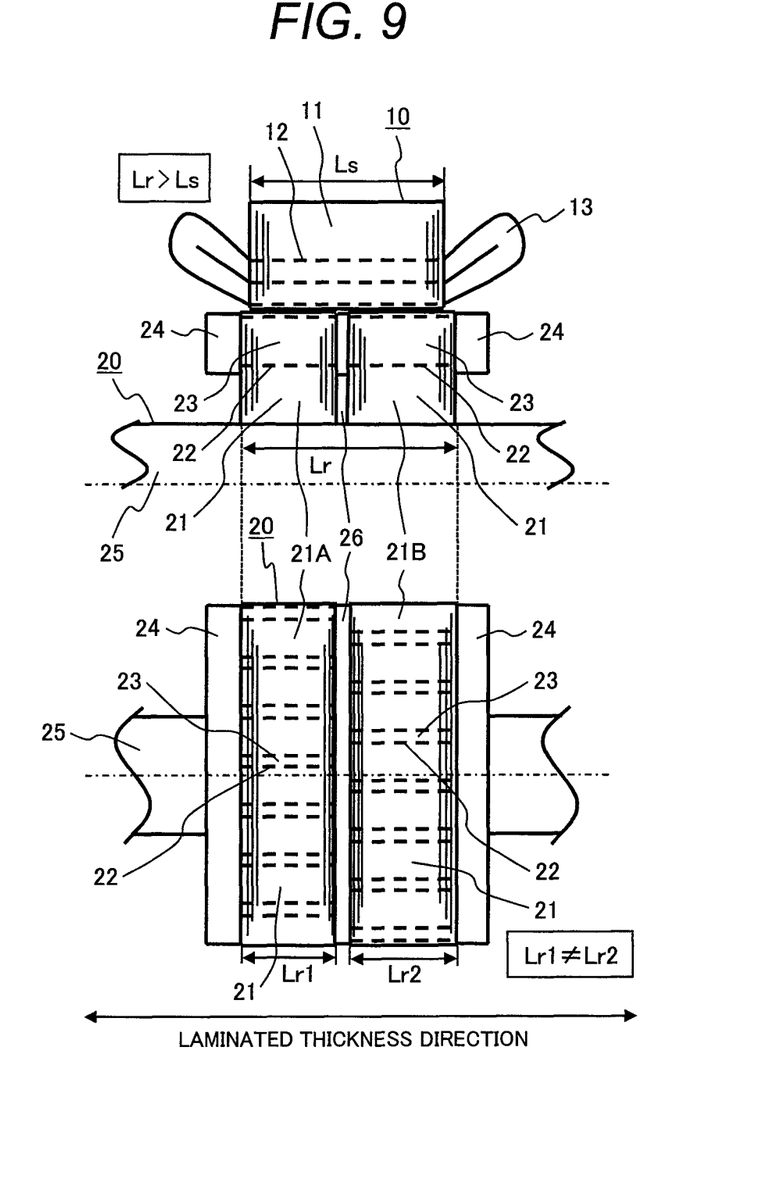
FIG. 9 is a drawing showing an example in which the width of the blocks are made different from each other in the constitution shown in FIG. 1.

FIG. 9 shows the second modification example of the first specific measure that can be executed while maintaining the features of the first specific measure.

In this case, the dimensions of the laminated thickness Lr1 and Lr2 of respective blocks (21A and 21B) of the rotor core 21 are differentiated when the rotor core 21 is formed of two blocks right and left.

The reason for adopting such formation on purpose is because of a fan attached inside a casing of the induction motor. Although fans are normally attached at both ends of the shaft 25, according to the construction of the induction motor, there may be a case that fans cannot be attached at both ends, or even when they can be attached, uniform cooling cannot be performed. When such non-uniform cooling is presumed, measures can be taken by adjusting the dimensions of the laminated thickness Lr1 and Lr2 of respective blocks (21A and 21B) so that heat generation on the side where more intensive cooling is possible becomes greater. Accordingly, when cooling performance differs between respective blocks because of the attaching position of the fan and the like, temperature rise in respective blocks can be equalized by differentiating the laminated thicknesses Lr1 and Lr2 of respective blocks. In the example shown in FIG. 9 for example, because heat generation on the block 21A side with larger laminated thickness is greater, such configuration is suitable to a case in which an intensive fan can be installed only on the left side of the shaft.

Figure 10:
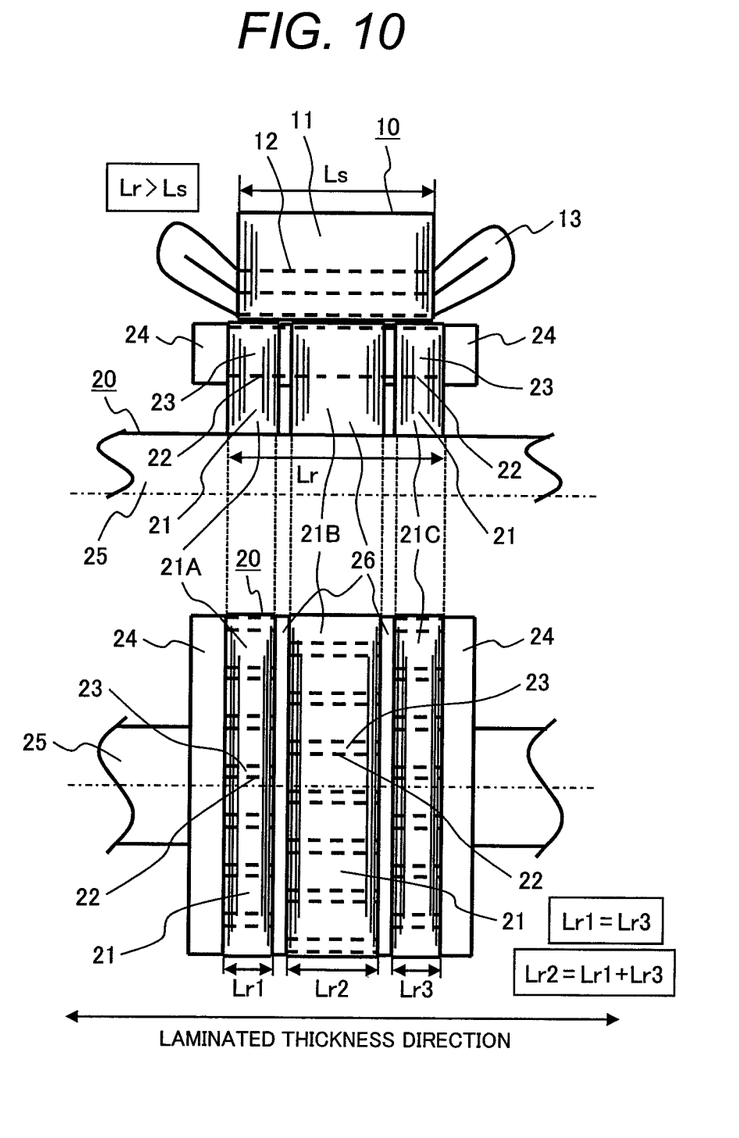
FIG. 10 is a drawing showing an example in which the block is divided into three and the width thereof are made different from each other in the constitution shown in FIG. 1.

FIG. 10 shows a further improvement utilizing the concept of the second modification example of the first specific measure (non-equalized laminated thickness due to dividing of the block) as the third modification example.

In this case, the rotor core 21 is formed of three or more blocks instead of two blocks right and left. Then, the positions of the slots 22 of respective blocks (21A, 21B, 21C) are disposed alternately with each other. In other words, the slot position is differentiated by 0.5 slot pitch between respective blocks.

As a result of it, because the slot position is differentiated by 0.5 slot pitch between respective blocks and the rotor 20 is made equivalent to have apparent skew, abnormal torque, vibration and noise can be suppressed, generation of cross current loss by the skew can be prevented, and efficiency can be improved. In particular, according to the present example, because the short circuit ring 26 is in two numbers to divide the block into three, the rotor 20 is equivalent to have greater apparent skew.

Also, according to the present example, the rotor core 21 is divided into three blocks, and the width of the blocks at both ends Lr1 and Lr3 are made equal with each other so as not to generate a force in the laminated thickness direction. However, Lr1 and Lr3 do not need to be equal with each other, and the effect of suppressing abnormal torque, vibration and noise is secured even in that case.

Further, according to the present example, the width of the center block Lr2 is made equal with the sum of Lr1 and Lr3 so that the effect of suppressing abnormal torque, vibration and noise can be exerted at maximum. However, Lr2 does not need to be equal with the sum of Lr1 and Lr3, and the effect of suppressing abnormal torque, vibration and noise is secured even in that case.

Figure 11:
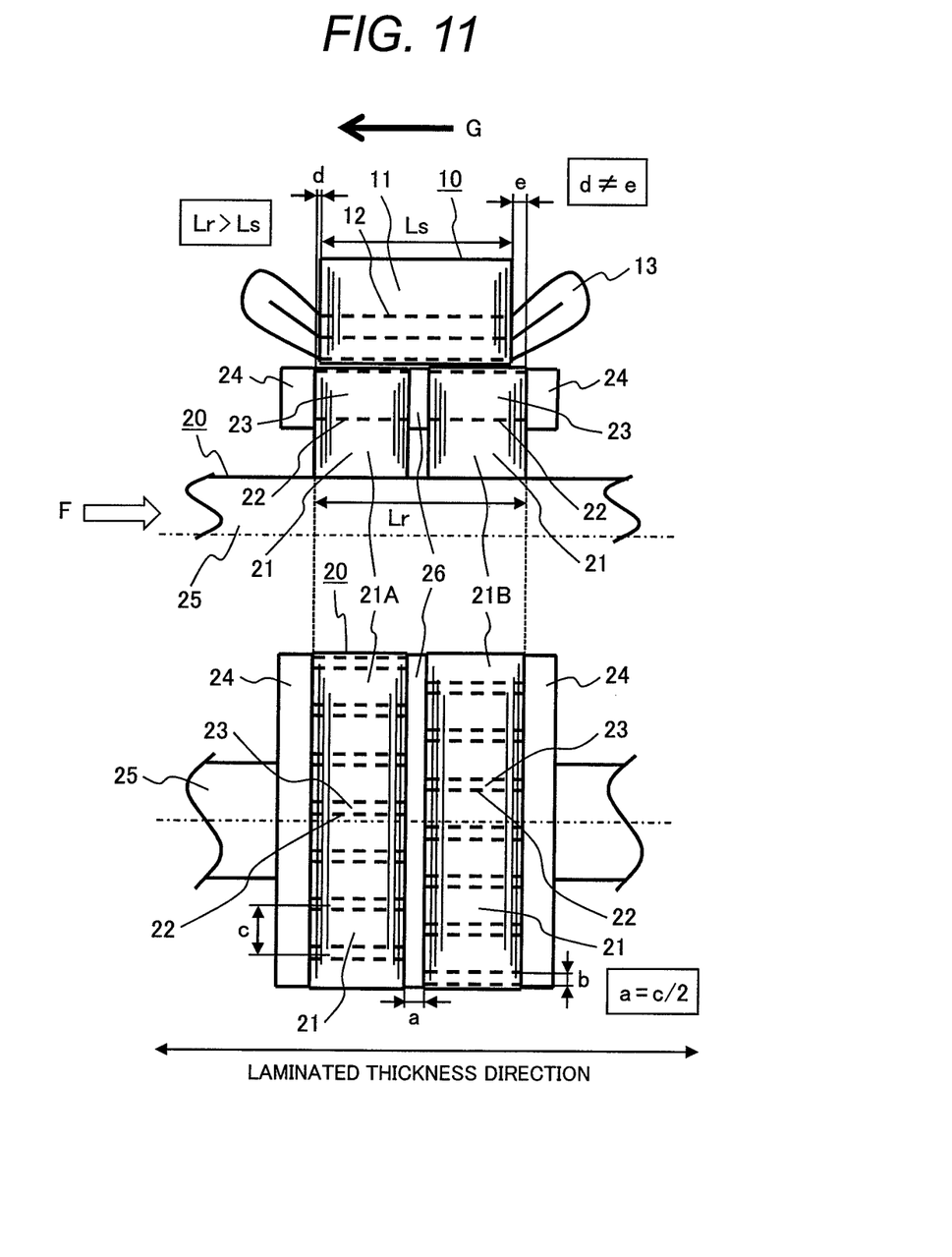
FIG. 11 is a drawing showing an example in which the difference of the laminated thickness is non-equally distributed to the right and left side of the stator in the constitution shown in FIG. 1.

FIG. 11 shows the fourth modification example of the first specific measure.

Here, the laminated thickness of the rotor core 21 is larger than the stator core 11 by d plus e, however d and e are not made equal with each other deliberately. As is apparent from FIG. 9, e is larger than d.

The reason for adopting such constitution on purpose is to prepare for the case an axial force is applied to the shaft 25 of the induction motor. When an external force F is applied to the shaft 25 from outside, an axial force G is generated by making e larger than d and can stand the external force F.

According to the present example, the force in the laminated thickness can be generated by differentiating the dimension of d and e. When the force in the laminated thickness direction is applied to the shaft 25 from outside, the force can be cancelled by differentiating the dimension of d and e so as to generate a force in the direction opposite to the external force.

Also, this constitution is not peculiar to the first specific measure. Because its point is the way of distributing the difference of the laminated thickness on the stator side, the constitution can be adopted in the second specific measure as well which utilizes the influence of the space factor.

The basic constitution according to the present invention and its applications were described above in detail. Although detail description was not given in each example, it is obvious that respective applications maintain the effects the basic constitution has.

According to the present invention, because the efficiency can be improved with a simple constitution, application to squirrel-cage induction motors for a variety of fields is possible.

What is claimed is:

1. A squirrel-cage induction motor comprising:
   a stator including laminated thin sheets, and including stator windings wound in a plurality of stator slots arranged at intervals in the vicinity of the inner periphery of a stator core; and
   a rotor including laminated thin sheets, and including rotor conductors embedded in a plurality of rotor slots arranged at intervals in the vicinity of the outer periphery of a rotor core and end rings are provided at both ends of the rotor core;
   wherein the quantity of laminated thin sheets in the stator core is equal to the quantity of laminated thin sheets in the rotor core;
   wherein an interval between laminated thin sheets in the rotor core is made larger than an interval between laminated thin sheets in the stator core;

wherein a laminated thickness of the rotor core is larger than a laminated thickness of the stator core;

wherein when viewed in a direction perpendicular to both a laminated thickness direction and a width of a short-circuit ring, a right end and a left end of the stator core are disposed within the width of the thickness of the rotor core as defined by the distance between the right end and the left end of the rotor core, and the distance in the shaft direction between the right end of the stator core and the right end of the rotor core differs from the distance in the shaft direction between the left end of the stator core and the left end of the rotor core.

2. The squirrel-cage induction motor according to claim 1, wherein the rotor slots are formed diagonal to the shaft with rotor conductors being embedded therein.

3. A squirrel-cage induction motor comprising:

a stator including laminated thin sheets, and including stator windings wound in a plurality of stator slots arranged at intervals in the vicinity of the inner periphery of a stator core; and a rotor including laminated thin sheets, and including rotor conductors embedded in a plurality of rotor slots arranged at intervals in the vicinity of the outer periphery of a rotor core and end rings provided at both ends of the rotor core;

wherein the quantity of laminated thin sheets in the stator core is equal to the quantity of laminated thin sheets in the rotor core;

wherein an interval between laminated thin sheets in the rotor core is made larger than an interval between laminated thin sheets in the stator core;

wherein a laminated thickness of the rotor core is larger than a laminated thickness of the stator core;

wherein when viewed in a direction perpendicular to both a laminated thickness direction and a width of a short-circuit ring, a right end and a left end of the stator core are disposed within the width of the thickness of the rotor core as defined by the distance between the right end and the left end of the rotor core;

wherein the rotor slots are disposed inside the width of the laminated thickness of the rotor core, and inside the laminated thickness of the stator core, are formed in a direction diagonal to the shaft direction with rotor conductors being embedded therein; and wherein the rotor slots disposed inside the width of the laminated thickness of the rotor core, and outside the laminated thickness of the stator core, are formed in the shaft direction with rotor conductors embedded therein.

* * * * *